United States Patent
Roddy et al.

[11] 3,712,438
[45] Jan. 23, 1973

[54] CENTRIFUGAL FRICTION CLUTCH

[75] Inventors: Joseph T. Roddy, Ballwin; Wayne L. Page, St. Louis, both of Mo.

[73] Assignee: Emerson Electric Co., St. Louis, Mo.

[22] Filed: March 15, 1971

[21] Appl. No.: 124,115

Related U.S. Application Data

[63] Continuation-in-part of Ser. No. 858,753, Sept. 17, 1969, abandoned.

[52] U.S. Cl............192/105 CD, 192/76, 192/107 M
[51] Int. Cl. ........................F16d 43/18, F16d 13/18
[58] Field of Search..........192/75, 76, 103 B, 104 B, 105 CD, 192/107 M

[56] References Cited

UNITED STATES PATENTS

| | | | |
|---|---|---|---|
| 1,983,661 | 12/1934 | Frantz et al.....................192/105 CD |
| 3,486,597 | 12/1969 | Carlton ....................................192/46 |
| 3,205,989 | 9/1965 | Mantey..............................192/84 C |
| 1,805,357 | 5/1931 | Breer..............................192/105 CD |

FOREIGN PATENTS OR APPLICATIONS 1,035,480   7/1958   Germany.......................192/105 CD Primary Examiner—Allan D. Herrmann
Attorney—Charles E. Markham

[57] ABSTRACT

A centrifugal friction clutch having a cup-shaped driven member with a hub receiving a driven shaft and a generally cylindrical driving member freely entered therein for rotation in one direction and comprising two generally semicylindrical shoes, a central hub receiving a driving shaft and a pair of flexible arms extending oppositely outward from the hub between the adjacent flat surfaces of the shoes and connecting the opposite trailing ends of the shoes to the hub, whereby centrifugal force moves the shoes radially into frictional engagement with the annular wall of the cup and whereby the frictional force is increased as the arms flex when stressed between peripheral frictional force and driving torque, both driving and driven members being formed as castings of synthetic plastic material and the cup-shaped driven member having a flexible bottom wall and a long flexible hub which flex to compensate for slight non-parallelism and misalignment of the driving and driven shafts to which the device is connected.

12 Claims, 5 Drawing Figures

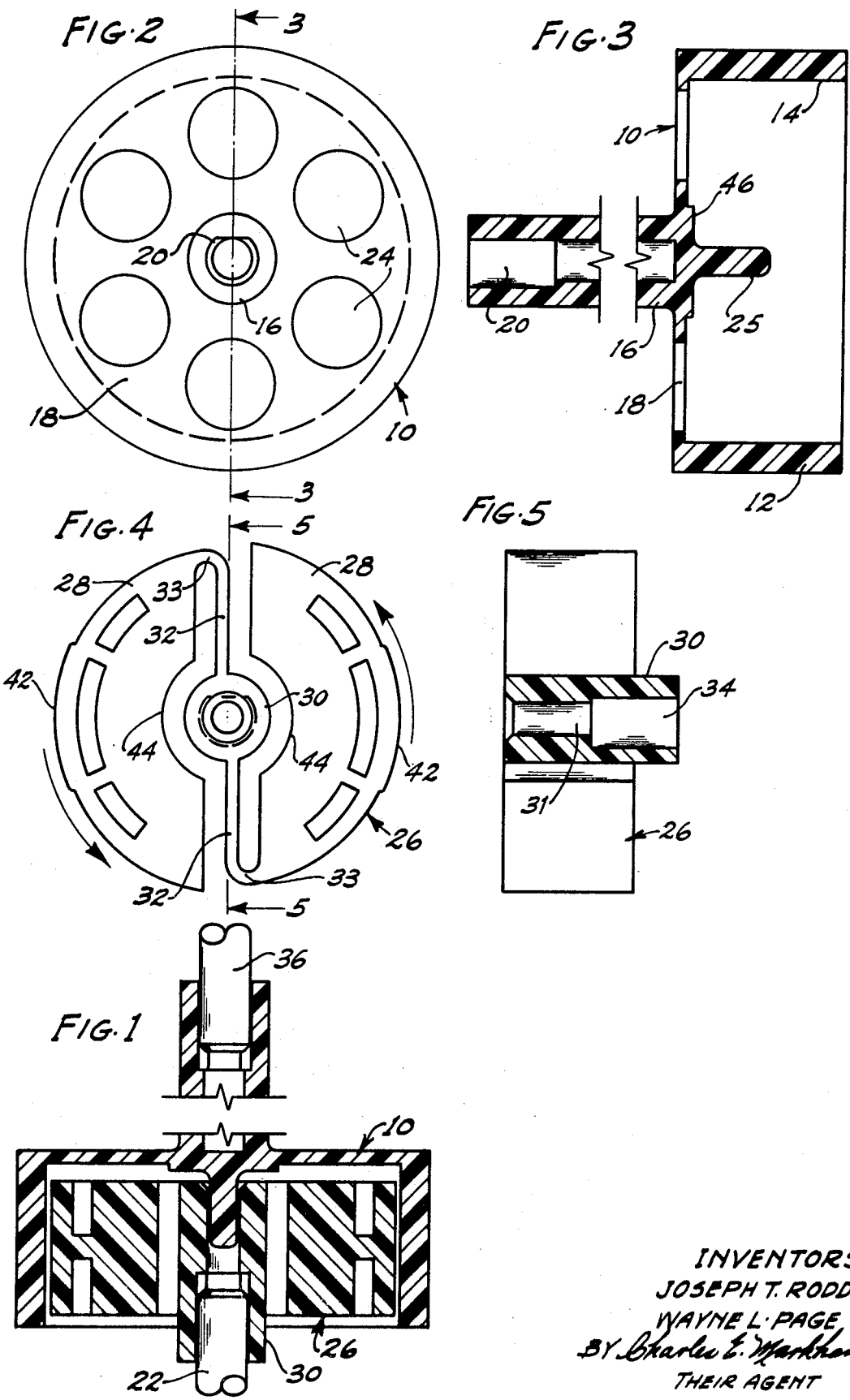

CENTRIFUGAL FRICTION CLUTCH

This application is a continuation-in-part of my copending application, Ser. No. 858,753, filed Sept. 17, 1969, and now abandoned.

This invention relates generally to centrifugal friction clutches which form a driving connection between a driving member and a driven member when the driving member attains a predetermined speed. More particularly, the invention relates to a centrifugal friction clutch in which shoe elements moved radially into frictional engagement against a resilient bias by centrifugal force to effect a driving connection are connected to a driving hub portion by resilient arms formed integral with the shoes and hub portion as a casting of suitable material.

THE PRIOR ART

German Patent No. 1,035,480 to Zimmerman discloses a centrifugal frictional governor having an immovably fixed cup member constructed of synthetic plastic material and a rotating member comprising a pair of weighted shoe portions, a hub portion, and long flexible arms connecting the shoe portions with the hub portion, all formed integral as a casting of synthetic plastic material. The hub portion of the rotating member is connected to a rotating driving mechanism, the speed of which is to be governed or limited by the device. In operation the frictional force between the shoes and the stationary cup member varies as the speed of the rotating member, due to centrifugal force, until a balance is reached between the torsional force of the driving means and the frictional force, whereafter the speed remains constant in the absence of other variables.

To operate satisfactorily, the frictional force must be purely a function of the centrifugal force developed; that is to say, the transmission of any radial force components of the driving torque to the shoes through the connecting arms would, due to the flexibility of the connecting arms, unpredictably increase the frictional force and therefore render the governed speed unpredictable. In order to preclude the transmission of any such radial force components of the driving torque to the shoes, Zimmerman has connected the leading end of his shoes with the hub portion, as indicated by the direction arrow 19 in FIG. 2 of his drawing and as stated in column 4, lines 14 and 15, of his description. This arrangement, in which the shoes are "pulled along the frictional surface" instead of being pushed, permits the employment of the long, flexible arms shown in Zimmermann, which provide the smooth action desirable in a device of this kind.

Rotation of the Zimmermann device in a direction opposite to that indicated would result in flexing and "wrapping up" of the long, flexible, connecting arms when frictional resistance at the shoe elements due to centrifugal force is encountered. This apparently would result in a rapid increase in the area of frictionally engaging surfaces and a stalling of the rotating member. The rotating member of Zimmermann employed as the driving member of a centrifugal friction clutch would not permit reliable predetermination of the speed at which a driving connection capable of driving a predetermined load would be effected.

SUMMARY OF THE INVENTION

Inasmuch as the centrifugal force developed in a centrifugal friction clutch varies directly with the weight and radius of rotation of the shoe elements and as the square of their speed, the diameter of the device and the weight and speed of the shoes may be considerably reduced by supplementing the centrifugal force with radial components of the driving torque transmitted to the shoes through their flexible connecting arms to effect the frictional force required for a driving connection. This supplementary force being effected by the flexing of the connecting arms when stressed between driving torque and reacting frictional force as the shoes are "pushed" along the surface acts to further increase the flexing of the arms and, therefore, increases very rapidly. The design and arrangement of the radially movable shoes and their flexible connecting arms is therefore quite critical if a driving connection is to be effected smoothly at a desired speed. This is particularly so in an economical construction of the driving member in which the shoes, the connecting arms, and the hub portion are formed as an integral casting of synthetic plastic material.

According to a preferred form of the present invention, the clutch comprises a cup-shaped driven member having an annular side wall, a bottom wall, and a long externally extending hub member receiving a driven shaft at its end, a driving member rotating in one direction loosely entered into the driven member and comprising a pair of generally semicylindrical shoes, a hub portion receiving a driving shaft, and a flexible arm connecting the trailing end of each shoe with the hub portion. The bottom wall and the long hub of the cup-shaped driven member are made flexible so that its annular side wall may tilt and move laterally slightly to compensate for slight misalignment and non-parallelism of the driving and driven shafts to which the clutch is connected.

The shoes are segments of a cylinder and are made just sufficiently less than semicylindrical to provide a space between the adjacent flat sides thereof for the positioning and flexing of a pair of generally straight flexible connecting arms extending oppositely from the hub portion to connections with opposite ends of the shoes. By making the shoes generally semicylindrical, the maximum size and, therefore, mass is attained in the available space.

In this arrangement the intermediate portions of the arms flex in one direction and the outer ends including small radius curves joining the outer ends of the arms to the shoes flex oppositely as the shoes move radially, due to centrifugal force, to effect frictional engagement of the arcuate shoe surfaces with the annular wall of the driven member. Also, in this arrangement, circumferential frictional force opposing the driving torque is transmitted to the outer ends of the arms through the rigid inflexible shoes in a direction substantially perpendicular to the arms. This arrangement permits radial movement of the shoes under centrifugal force while controlling the application of radial torque components so as to smoothly effect a driving connection after an initial frictional force is established by centrifugal force.

An object of the invention is to provide a centrifugal friction clutch of particularly simple and low-cost construction comprising only two parts formed as castings of synthetic plastic materials.

A further object is to provide a centrifugal friction clutch having a cup-shaped driven member and a cylindrical driving member entered into the driven member comprising a pair of semicylindrical shoes connected at their opposite ends to a central hub by flexible connecting arms lying between the flat sides of the adjacent shoes, and in which the shoes, the hub, and the connecting arms are formed integral as a casting of synthetic plastic material.

A further object is to provide a centrifugal friction clutch as characterized in the preceding paragraph in which the trailing ends of the shoes are connected to the hub.

A further object is to provide a centrifugal friction clutch comprising a cup-shaped driven member having an annular side wall, a bottom wall, and a hub member formed as an integral casting of synthetic thermoplastic material, and a generally cylindrical driving member entered loosely into the driven member comprising a pair of generally semicylindrical shoes, a central hub portion, and a pair of flexible arms lying between the shoes and connecting the opposite trailing ends of the shoes to the hub, in which both the driven and driving members are castings of synthetic plastic material.

A further object is to provide a centrifugal friction clutch as characterized in the preceding paragraph in which small particles of other materials are embedded in the synthetic plastic material of which both members are constructed, which particles increase the elasticity and strength of the material and in which the material of the driven member includes small metal particles which increase the dissipation of heat and reduce the wear at frictionally engaging surfaces.

A further object is to provide a centrifugal friction clutch as characterized in the penultimate paragraph in which the bottom wall of the cup-shaped member is flexible and in which the hub member is relatively long and flexible, thereby to permit slight tilting and lateral movement of the annular side wall of the cup to compensate for slight misalignment and non-parallelism of the driving and driven shafts to which the clutch members are connected.

Further objects and advantages will appear from the following description when read in connection with the accompanying drawing.

In the drawing:

FIG. 1 is a longitudinal cross-sectional view of a centrifugal friction clutch constructed in accordance with the present invention;

FIG. 2 is an end elevational view of the driven member;

FIG. 3 is a longitudinal cross-sectional view of the driving member; and

FIG. 5 is a longitudinal cross-sectional view of the driving member taken along line 5—5 of FIG. 4.

Referring to the drawing, a generally cup-shaped driven member, generally indicated at 10 in FIG. 1, is shown alone in FIGS. 2 and 3. Driven member 10 is formed as a casting of synthetic plastic material and comprises a relatively thick annular side wall portion or drum 12 having a true circular interior surface 14, a concentric, exteriorly extending, relatively long, hollow hub 16, and a bottom wall 18 connecting the drum and hub. The long hollow hub 16 is relatively flexible and is provided with a short non-circular bore 20 at its outer end adapted to receive the non-circular end of a driven shaft 22. The bottom wall 18 is considerably thinner than the annular side wall 12 and is provided with circularly arranged perforations 24 which render the wall 18 relatively flexible. The flexibility of the bottom wall 18 permits the annular wall portion 12 to be tilted slightly with respect to the axis of the hub 16 and the flexibility of the long hub 16 permits the slight lateral movement of the annular wall portion 12 with respect to the axis of a driven shaft inserted in the end of the hub. The driven member 10 is further provided with a central internally extending guide pin 25.

A driving member generally indicated at 26 is shown alone in FIGS. 4 and 5. Driving member 26 is also formed as a casting of synthetic plastic material and includes a pair of generally semicylindrical shoes 28, a hub 30, and a pair of flexible connecting members or arms 32 resiliently connecting opposite ends of the shoes 28 to the hub 30. The hub 30 has a round bore 31 entering from one end which freely receives the guide pin 25 and a non-circular bore 34 entering from its other end adapted to receive the non-circular end of a driving shaft 36.

Referring to FIG. 4, each of the shoes 28 has an intermediate, slightly raised, arcuate surface portion 42 having a slightly greater radius than that of the end portions of the arcuate shoe surfaces. The radius of the arcuate surface portion 42 is substantially the same as that of the inside surface of the annular wall 12 of the driven member while the radii of the end portions of the arcuate shoe surfaces are slightly less. The diametral dimension between the surface portions 42 is somewhat less, however, than the inside diameter of the annular side wall 12 of the driven member when the driving member is unstressed, so that the driving member is entered loosely into the driven member.

The shoes 28 are actually segments of a cylinder which are made just sufficiently less than semicylindrical to provide sufficient space between their flat sides for the positioning and flexing of the arms 32. The arms 32 are preferably substantially straight and lie substantially parallel with the straight sides of the shoes. Clearance is also provided between the hub 30 and the shoes 28 by the provision of arcuate recesses 44 in the straight sides of the shoes. The flexible members 32 extend oppositely from the hub 30 and are connected to opposite ends of the shoes 28 through arcuate portions 33 of small radii.

While other suitable synthetic plastic materials may be used, we prefer to form the driven member 10 as a casting of suitable synthetic material having embedded therein glass fibers and to form the driving member 26 as a casting of different suitable synthetic plastic material having embedded therein glass fibers and metal chips. The strength and elasticity required in the driving member is attained by including the glass fibers. It was found that by constructing the driven member of a different synthetic plastic material than that of the driving member greater frictional force could be developed between the shoes and the driven member due to centrifugal force. This is desirable in that it permits employing less flexible connecting arms, thereby permitting the transmission of greater driving torque. Constructing the driven member of a polyurethane thermoplastic material provided this increased frictional force, but lacked the required structural strength and tended to heat unduly along its frictionally engaged surface to the extent that it softened and balled up.

However, by adding glass fibers and small metal particles in sufficient quantity to polyurethane in a molten state, a composite material having the required structural strength and the ability to disperse and transfer the heat of friction sufficiently from the engaging surface to overcome the heating problem resulted. Also, it was found that the addition of small metal particles substantially reduced the rate of wear at the frictionally engaged surface.

OPERATION

The clutch may be used, for example, as a driving connection between a low-cost electric motor having a low starting torque and a liquid displacement pump, in which the shaft 22 in FIG. 1 is the pump impeller shaft and the shaft 36 is the motor shaft. The device is shown in a still condition in FIG. 1, in which condition there is a diametral clearance between the surfaces 42 of shoes 28 and the annular wall 14 of the driven member and a somewhat smaller diametral clearance between the central guide pin 25 and the bore 31 in hub 30. The driving member is, therefore, free to rotate in the driven member at low speeds, but is prevented from rattling against the wall of the driven member.

When the electric motor is started, the driving member 26 is rotated freely in the direction indicated by the arrows in FIG. 4. At low speed the driving member may float axially slightly in the driven member due to end play in the motor shaft. To prevent engagement of the inner face of the shoes 28 with the bottom wall of the cup, a small diameter circular portion 46 raised slightly from the bottom wall of the driven member is provided, whereby the inner end of hub 30 engages the portion 46 when the driving member moves axially inward.

As the speed of the electric motor increases to a predetermined speed somewhat less than its maximum no-load speed, the shoes 28 are moved radially outward by centrifugal force and into engagement with the surface 12 of the driven member with sufficient radial force to effect an initial frictional force opposing rotation of the driving member. As the shoes 28 move radially outward from their still positions into engagement with the wall 12, the intermediate portions of the connecting arms flex with their outer ends moving in the direction of rotation. This tends to tilt the leading end of the shoes slightly inward. However, the outer ends of the arms including the small radius curved portions or bights 33 connecting the outer ends of the arms to the shoes also flex but in an opposite direction, thereby compensating the tilting of the shoes so that the centers of curvature of the arcuate shoe portions 42 move radially substantially along a straight line intersecting the center of curvature of wall 12.

When the initial frictional force is established by centrifugal force at a predetermined motor speed, the resistance of the load acting through this frictional force stresses the connecting arms 32 so that their outer ends try to flex in a direction opposite to the direction of rotation. This flexing effects the application of radial components of the driving force to the shoes, thereby increasing the frictional force. This increased frictional force in turn further stresses and flexes the arms. The action is cummulative until the load is overcome.

The semicylindrical form of the shoes 28 utilizes the available space to provide the required mass to effect the initial frictional force without the necessity of adding weighting material having greater specific gravity than the synthetic plastic material of the shoes. The provision of the intermediate arcuate contacting portions 42 on the shoes provides smoother engagement of the driving member and precludes the frictional engagement or digging in of the leading ends of the shoes which may otherwise effect a jolting engagement of the driving member with objectionable impact force. In event the driving and driven shafts to which the device is connected are not exactly parallel or exactly aligned, which frequently occurs, the bottom wall and long hub 16 of the driven member will flex to compensate for this.

We claim:

1. A centrifugal friction clutch comprising a driven member having an annular wall and a driving member of general cylindrical form loosely entered into said annular wall, said driving member being adapted to rotate in one direction and being formed as a casting of synthetic plastic material and comprising as integral portions thereof a pair of shoe members of general semicylindrical form with flat sides facing each other in spaced relationship, a central hub member adapted to receive a driving shaft, and a flexible arm connecting each of said shoes to said hub, said connecting arms extending oppositely and radially from said hub between the adjacent flat sides of said shoes to connection with the opposite trailing ends of said shoes whereby said shoes are movable radially to engage said annular wall, said shoes being segments sufficiently less than semicylindrical to provide space between the flat sides thereof for the positioning and flexing of said arms and the flat sides of said shoes being recessed to provide clearance for said hub.

2. The clutch claimed in claim 1 in which said connecting arms are substantially straight and spaced from coextending portions of the flat shoe surfaces and each including a short arcuate portion at its outer end connecting its outer end with the end of its respective shoe.

3. The clutch claimed in claim 1 in which said driven member is a cup-shaped member formed as a casting of synthetic plastic material and includes in addition to said annular wall as integral portions thereof a central hub for receiving a driven shaft and a bottom wall joining said hub with said annular wall.

4. The clutch claimed in claim 1 in which the plastic material of which said driving member is formed includes glass fibers dispersed therein in sufficient quantity to provide the elasticity required in said connecting arms to permit outward travel of said shoes under centrifugal force with sufficient recovery force to retract them and to provide the strength required in said connecting arms to transmit the torque without undue flexing.

5. The clutch claimed in claim 3 in which said driven member is formed of a synthetic plastic material other than the material of which said driving member is formed, and which includes dispersed therein small metal particles in an amount to substantially increase dissipation of heat developed in small local areas of the frictionally engaged surface.

6. The clutch claimed in claim 5 in which the material of which said driven member is formed further includes dispersed therein glass fibers in an amount necessary to attain the flexibility and strength required.

7. In a centrifugal friction clutch, a cup-shaped driven member comprising an annular side wall, a bottom wall, and a hub receiving a driven shaft, a generally cylindrical driving member loosely entered into said driven member and comprising a pair of generally semicylindrical shoes with flat sides facing each other in spaced relationship, a central hub, and a pair of flexible arms connecting the opposite ends of the shoes with the hub whereby the shoes are moved radially outward by centrifugal force into engagement with said annular wall, driving means including a drive shaft entered into said central hub operative to drive said driving member in a predetermined direction of rotation, said flexible arms being substantially straight and extending radially between the adjacent flat sides of said shoes and connecting that end of each shoe with said hub member which is trailing with respect to said predetermined direction of rotation.

8. The subject matter claimed in claim 7 in which said driven member is formed as a casting of synthetic plastic material and in which said bottom wall is flexible, thereby to permit tilting of the annular side wall to compensate for slight non-parallelism of said driving and driven shafts.

9. The subject matter claimed in claim 7 in which said hub of said driven member is relatively long and flexible whereby it flexes to compensate for any slight misalignment of said driving and driven shafts.

10. The subject matter claimed in claim 7 in which said driven member further includes an internal axially extending guide pin and in which said hub of said driving member includes an axial bore receiving said guide pin, the fit of said guide pin in said hub being such as to permit the free rotation of the driving member therein while preventing contact of the driving member with the annular wall of the driven member when said driving member is in a retracted position.

11. The subject matter claimed in claim 7 in which the arcuate surfaces of said generally semicylindrical shoes each include an intermediate, raised, arcuate surface portion arranged to frictionally engage said annular wall of said driven member and to space the remainder of the arcuate shoe surface from said annular wall.

12. The subject matter claimed in claim 11 in which said raised arcuate surface portions have a radius substantially equal to the radius of curvature of said annular wall of said driving member.

* * * * *